US008045831B2

(12) United States Patent
Popp

(10) Patent No.: US 8,045,831 B2
(45) Date of Patent: Oct. 25, 2011

(54) TWO DIMENSIONAL FIBER COLLIMATOR ARRAY WITH HIGH RETURN LOSS

(75) Inventor: Gregor Popp, München (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 0 days.

(21) Appl. No.: 12/694,125

(22) Filed: Jan. 26, 2010

(65) Prior Publication Data

US 2011/0182547 A1 Jul. 28, 2011

(51) Int. Cl.
*G02B 6/32* (2006.01)
(52) U.S. Cl. ............... 385/33; 385/15; 385/31; 385/53; 385/88
(58) Field of Classification Search ............. 385/15, 385/31, 33, 53, 88
See application file for complete search history.

(56) References Cited

U.S. PATENT DOCUMENTS

| 5,371,814 | A | 12/1994 | Ames et al. | |
|---|---|---|---|---|
| 5,442,721 | A | 8/1995 | Ames | |
| 6,625,350 | B2 * | 9/2003 | Kikuchi et al. | 385/33 |
| 7,424,183 | B2 * | 9/2008 | Akashi et al. | 385/33 |

* cited by examiner

*Primary Examiner* — Jennifer Doan
(74) *Attorney, Agent, or Firm* — Meyertons, Hood, Kivlin, Kowert & Goetzel, P.C.; Eric B. Meyertons

(57) ABSTRACT

A lens system includes a body member holding at least one micro lens array. The micro lens array has a first surface with a plurality of micro lenses arranged in a row and a second surface opposing the first surface. The second surface is under an angle towards the first surface. Furthermore the lens system comprises either: (i) a plurality of ferrules enclosing end-portions of light waveguides, or (ii) a plurality of light waveguides without ferrules, wherein the ferrules or light waveguides are adhesively fastened in a spaced relationship from each other to the second surface of the micro lens array preferably by means of an adhesive, by bonding or by welding.

8 Claims, 8 Drawing Sheets

TWO DIMENSIONAL FIBER COLLIMATOR ARRAY WITH HIGH RETURN LOSS

BACKGROUND OF THE INVENTION

1. Field of the Invention

The invention relates to a fiber optic collimator array particularly for use in optical rotary joints, optical rotary joints and a method for manufacturing a fiber collimator array.

2. Description of the Relevant Art

Various transmission systems are known for transmission of optical signals between units that are rotatable relative to each other.

U.S. Pat. No. 5,371,814 discloses an optical rotary joint for a plurality of channels, having a Dove prism. An arrangement having a plurality of GRIN lenses is provided for coupling light into or out of glass fibers.

U.S. Pat. No. 5,442,721 discloses another optical rotary joint having bundled collimators assemblies.

SUMMARY OF THE INVENTION

The following description of various embodiments of optical rotary joints and lens systems is not to be construed in any way as limiting the subject matter of the appended claims.

The embodiments are based on the object of providing a fiber optic collimator, a rotary joint based on the fiber collimator and a method for manufacturing the fiber collimator where the fiber collimator includes a plurality of lenses on a micro lens array.

In an embodiment a lens system includes a body member holding at least one micro lens array. The micro lens array has a first surface with a plurality of micro lenses arranged in a row and a second surface opposing the first surface. The second surface is under an oblique angle towards the first surface. The row of lenses is arranged in such a way that the distance from the lens to the location where the corresponding optical fiber is attached on the second surface is always the same for each lens of the row. Furthermore the lens system includes either: (i) a plurality of ferrules enclosing end-portions of light waveguides, or (ii) a plurality of light waveguides without ferrules, wherein the ferrules or light waveguides are fastened in a spaced relationship from each other to the second surface of the micro lens array preferably by means of an adhesive, by bonding or by welding.

In another embodiment at least one alignment mark is provided on the lens array to simplify adjustment of the lens array on the body member.

In a further embodiment at least two rows are arranged in parallel on said second surface. The rows of lenses are arranged in such a way that the distance from a lens to the location where the corresponding optical fiber is attached on the second surface is always the same for each lens of a row.

In a further embodiment a rotary joint includes at least one lens system and at least one derotating element such as a dove prism.

A further embodiment relates to a method for manufacturing the lens system. The method includes:

a. inserting of uncoated optical fiber ends into a support member or between first and second support plates;
b. polishing the support member or support plates together with the optical fiber ends to obtain a surface under an angle;
c. bonding the support member or support plates together with the optical fibers to a micro lens array; and
d. inserting the micro lens array into a body member.

The steps c. and d. may be exchanged in their order resulting in executing the steps a., b., d., c.

BRIEF DESCRIPTION OF THE DRAWINGS

In the following, the invention will be described by way of example, without limitation of the general inventive concept, on examples of embodiment and with reference to the drawings.

Figure 1:
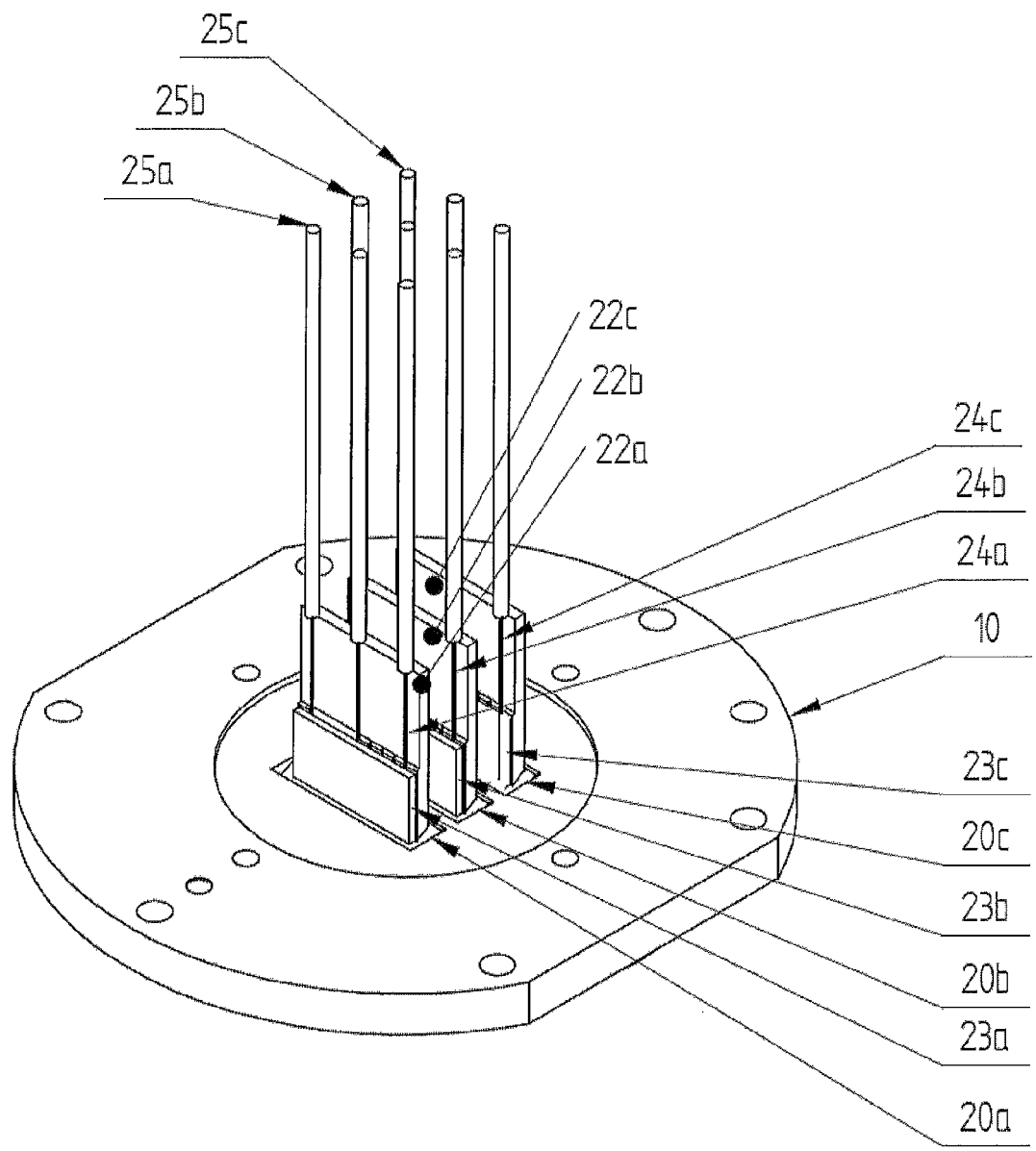
FIG. 1 shows a lens system with micro lens arrays arranged in a body member.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a lens system with micro lens arrays arranged in a body member. The body member 10 has grooves for holding the individual micro lens arrays 20a, 20b, 20c. First support plates 22a, 22b and 22c are provided together with second support plates 23a, 23b, 23c to support a plurality of uncoated optical fibers 24a, 24b and 24c. These uncoated optical fibers are part of the coated optical fibers 25a, 25b, 25c with removed coating. At least one of first and second support plates have grooves 26 for proper alignment of the uncoated optical fibers. As an alternative to the first support plates and second support plates a support member having grooves or holes for holding the uncoated optical fibers may be used.

Figure 2:
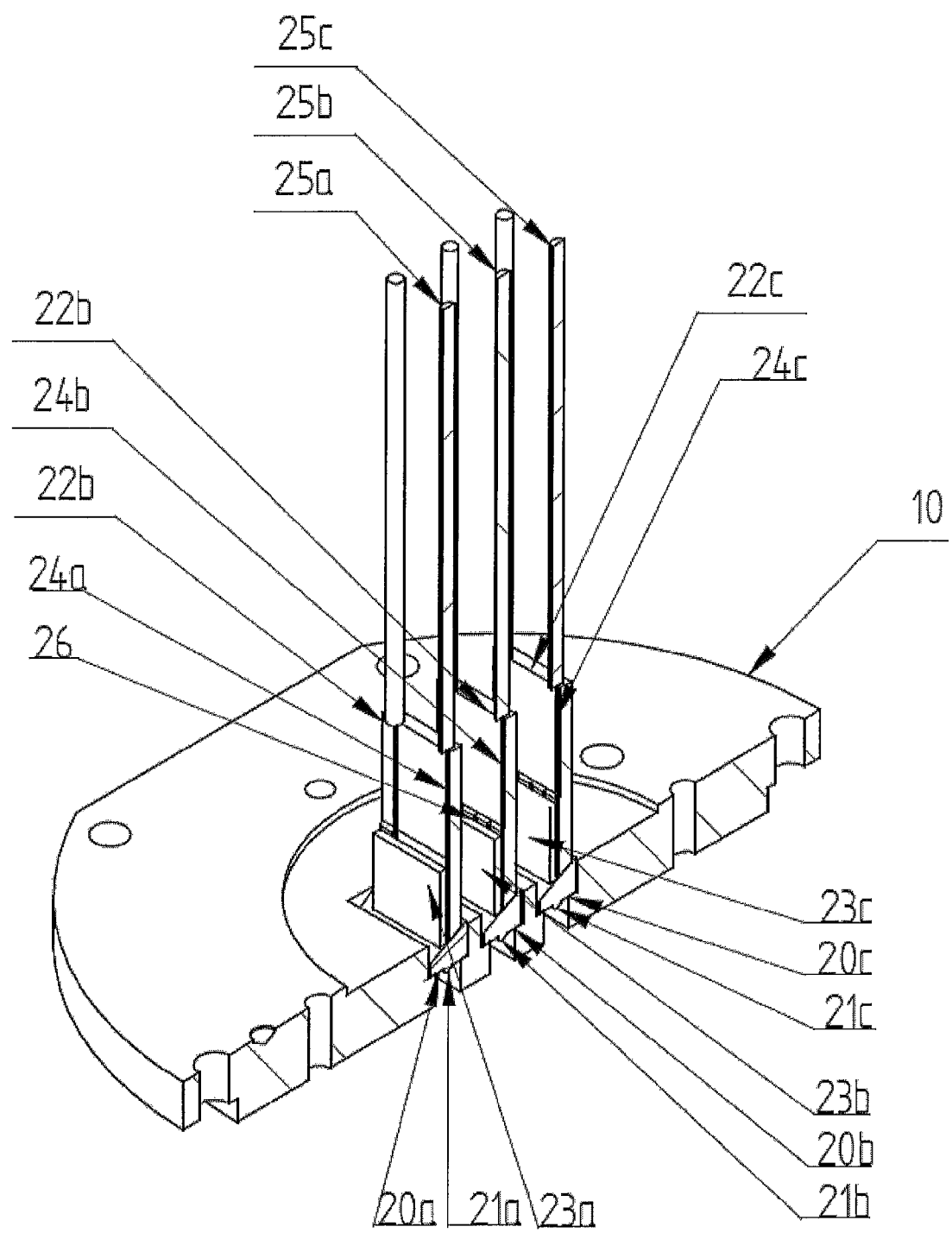
FIG. 2 shows a sectional view of FIG. 1.

FIG. 2 shows a sectional view of the lens system with micro lens arrays arranged in a body member. Each of the micro lens arrays 20a, 20b, 20c has micro lenses 21a, 22b, 22c.

Figure 3:
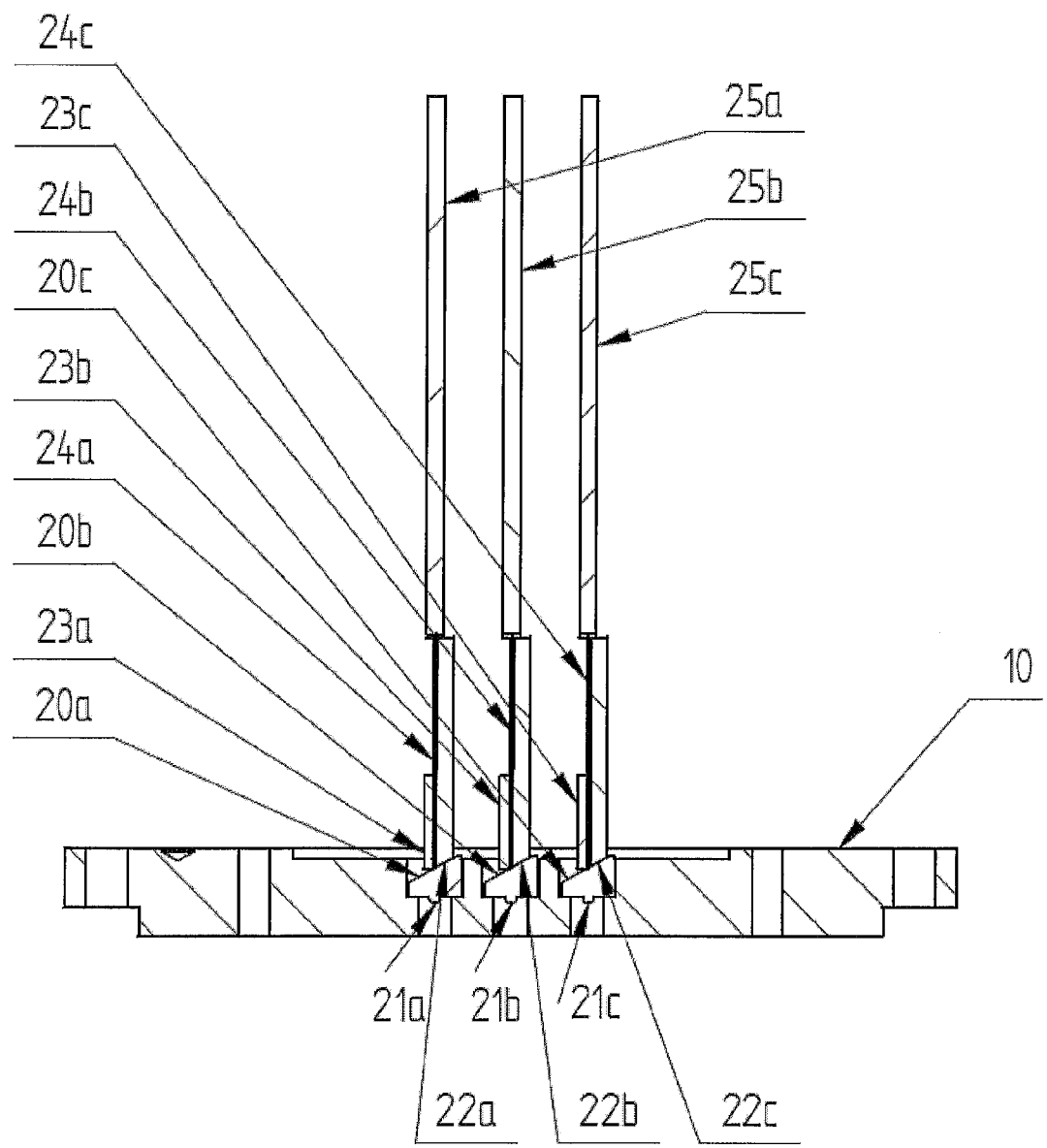
FIG. 3 shows a sectional side view.

FIG. 3 shows another sectional view of the lens system. The seat surface 43 on which the lens arrays are seated has slots 42 for light from the lenses to pass through.

Figure 4:
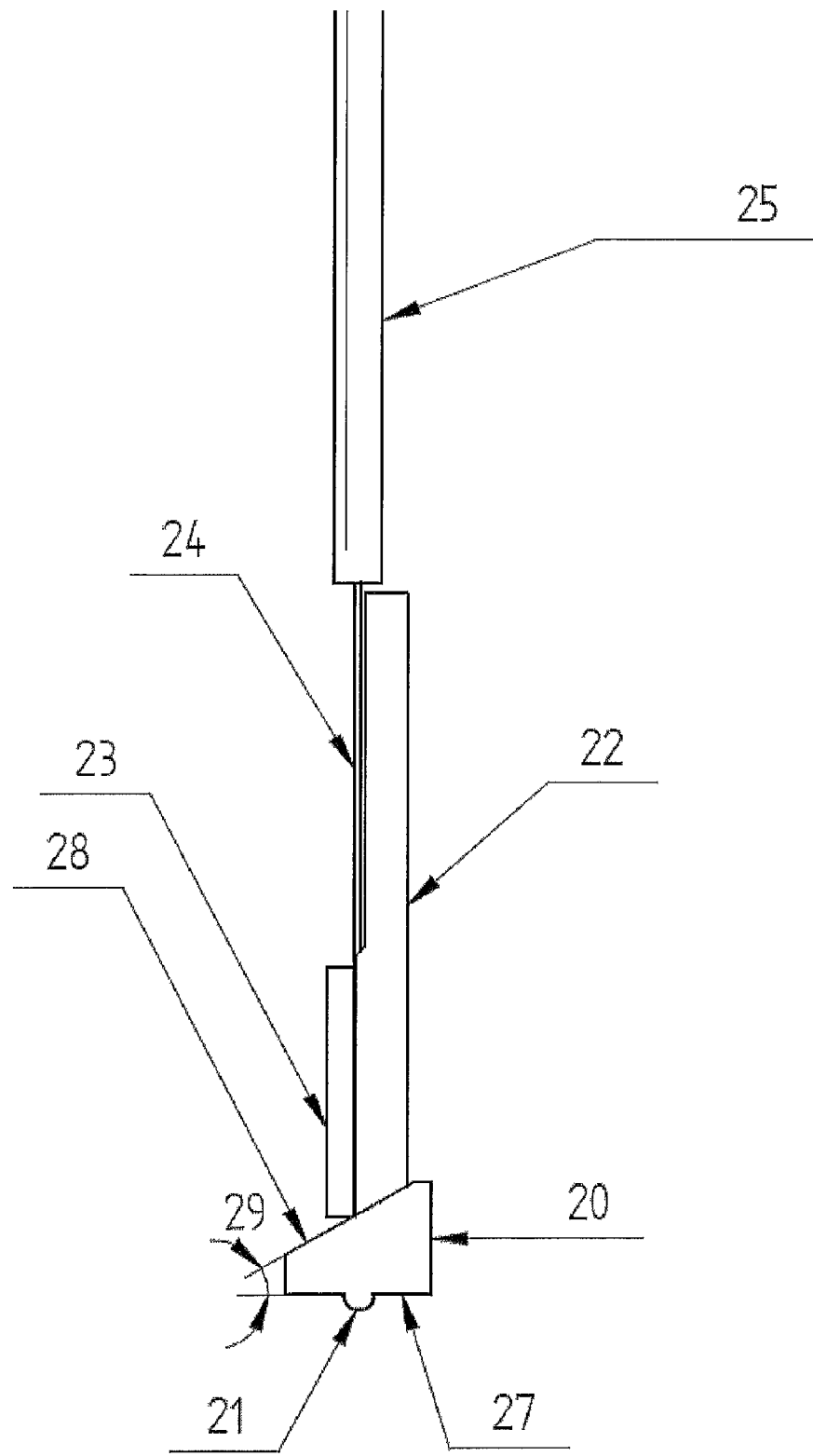
FIG. 4 shows a side view of one of the micro lens arrays.

FIG. 4 shows a side view of one of the micro lens arrays. It has a first surface 27 with a plurality of micro lenses 21 and a second surface 28. The first and second surfaces are arranged under an angle 29. This angle 29 is preferably in a range between 5 and 20 degrees. The optimum angle is at 8 degrees. The optical fiber 24 is attached at the second surface 28 having approximately a right angle to the first surface 27. As the second surface 28 under an angle 29 to the first surface 27, the end of the optical fiber 24 is at the same angle. This angle reduces reflection of optical signals coming from the optical fiber 24 back into the optical fiber and therefore increases return loss.

The second surface may be machined by a wafer dicing saw. In most cases the surface quality of this manufacturing step is not sufficient. Therefore a second manufacturing step is required to obtain a smooth surface. This may be done by etching, sand blasting, high-pressure water jet, polishing by a polishing disk, plasma etching, ultrasonic cutting. As an alternative the surface may be wetted by a medium having an adapted refraction index like a gel, oil or even a cured glue. As a further alternative the surface may be melted, e.g., in an oven, by microwave radiation or by a laser beam.

A problem in manufacturing the micro lens system is the connection of the optical fiber to the second surface. If there is glue or any kind of epoxy between the optical fiber and the second surface, only a specific type of optical transparent glue may be used. Furthermore it must have an adapted refraction index. An improvement is as shown e.g., in FIG. 4. There is no glue between the fiber and the second surface. Instead the fiber is held by a separate holding assembly including first and second support plates. This may result in a gap between the fiber end and the second surface. Preferably the gap between the fiber and the second surface is protected by some surrounding material like epoxy, while the interior contains some protective gas.

Figure 5:
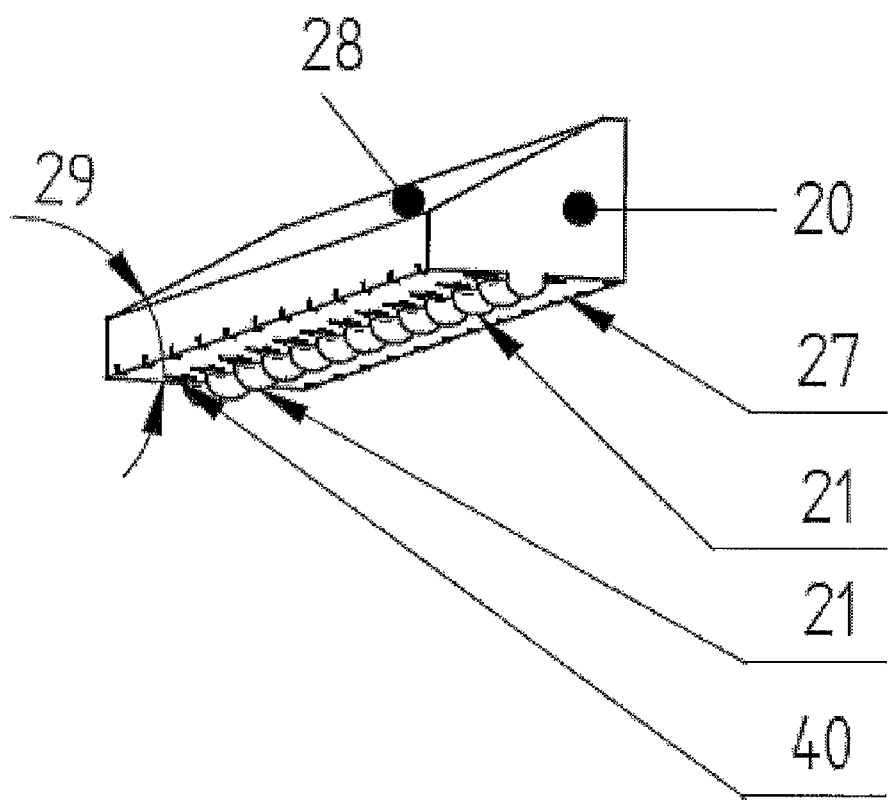
FIG. 5 shows a perspective view of a micro lens array.

FIG. 5 shows a perspective view of a micro lens array 20. The micro lens array is one piece of an optical material like glass or silicon. Cross shaped alignment marks 40 are provided for aligning the micro lens array on the body member. Preferably the alignment marks are made by the same process (like a photolithoghraphic process) by which the lenses are made. This allows generating the marks in a precise relationship to the lenses. The alignment marks may also be used to adjust a saw for cutting out pieces of the micro lens array, having the appropriate length for the body member.

Figure 6:
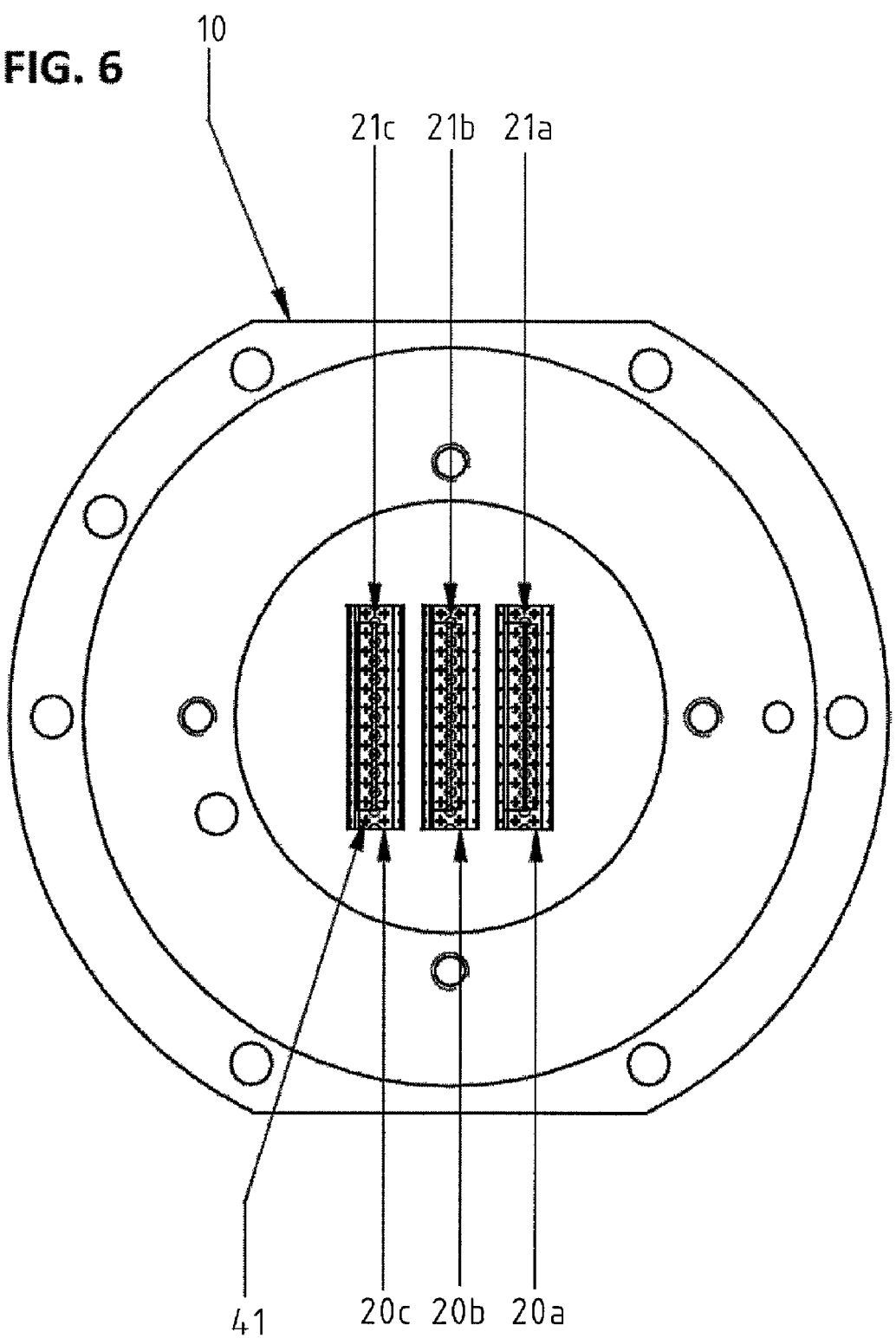
FIG. 6 shows a top view of the lens system.

FIG. 6 shows a top view of the lens system. The cross shaped alignment marks 41 on the body member are clearly visible through the transparent lens system. They are aligned with the alignment marks 40 on the microlens array.

Figure 7:
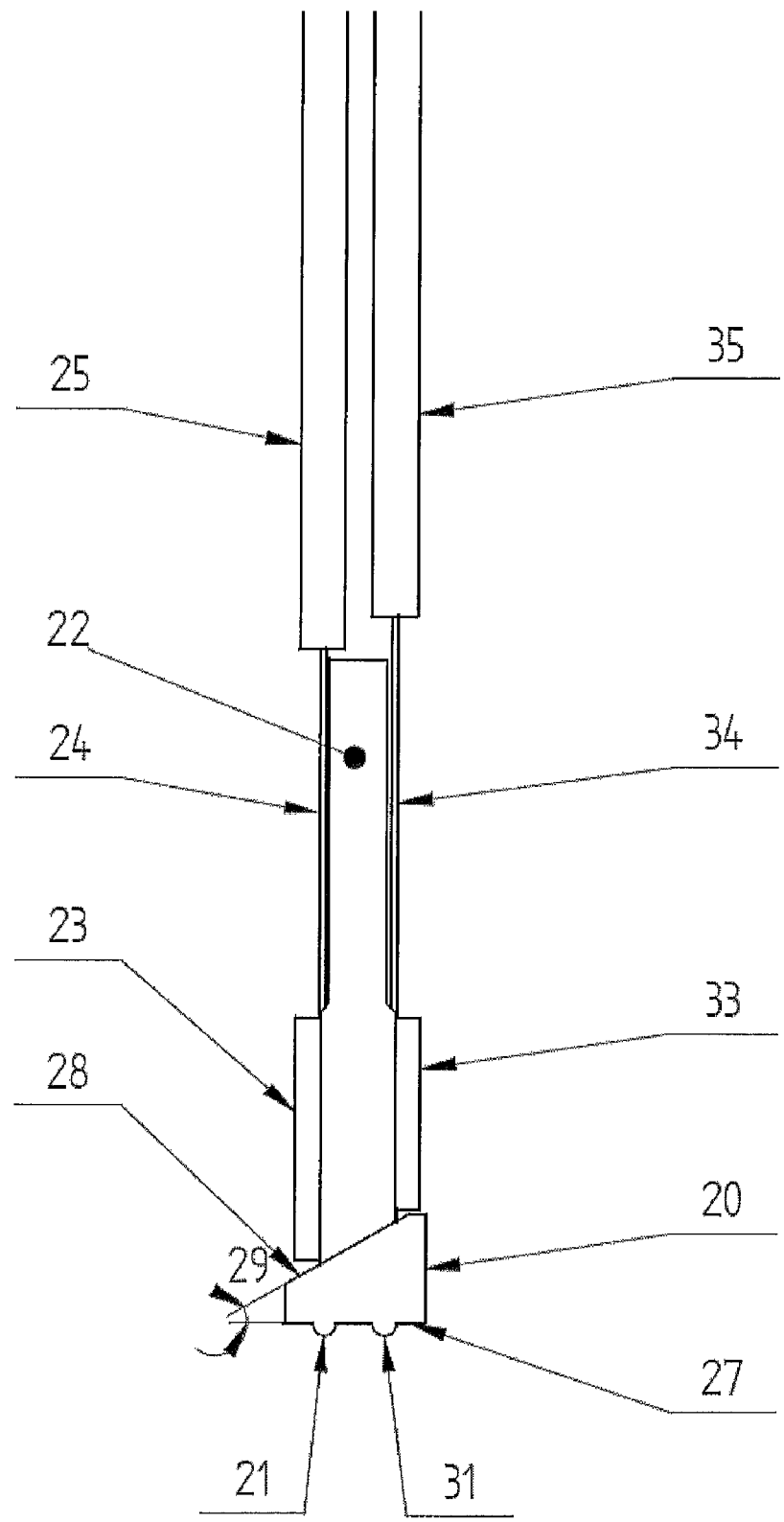
FIG. 7 shows a micro lens array having two parallel rows of lenses.

In FIG. 7 another micro lens array is shown. In addition to the first row of micro lenses 21 on the first surface 27 it has a second row of micro lenses 31 of the first surface 27. Corresponding second optical fibers 34 are on the second surface 28. The optical path between first micro lenses 21 and first optical fibers 24 is shorter than the optical path between second micro lenses 31 and second optical fibers 34. To get comparable optical characteristics the second micro lenses have a larger focal length than the first micro lenses 21. Also three rows or any other numbers of rows of micro lenses may be used.

Figure 8:
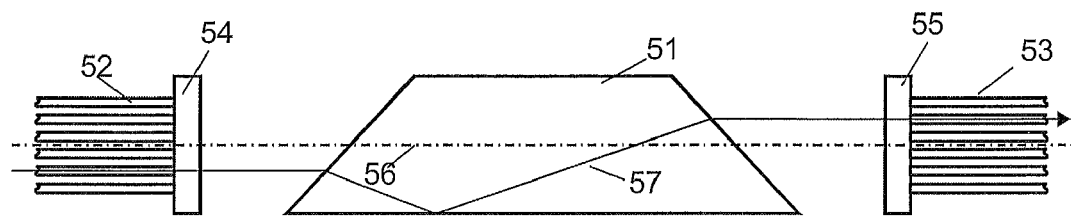
FIG. 8 shows a rotary joint.

FIG. 8 shows in a schematic form an embodiment of an optical rotary joint having at least one lens system in accordance with the invention at least one of the embodiments described herein. The optical rotary joint shown in FIG. 8 includes a first lens system 54 for coupling of first light-waveguides 52, and also a second lens system 55 for coupling of second light-waveguides 53. The second collimator arrangement 55 is supported to be rotatable relative to the first collimator arrangement 54 about a rotation axis 56. A derotating element in the form of a Dove prism 51 is located in a beam path between the first collimator arrangement 54 and the second collimator arrangement 55 to compensate for the rotary movement. An example of a ray path of a light ray 57, which starts from one of the first light-waveguides 52 and passes via the first collimator arrangement 54, through the Dove prism 51, and via the second collimator arrangement 55 up to and into one of the second light-waveguides 53 is shown.

It will be appreciated to those skilled in the art having the benefit of this disclosure that this invention is believed to provide optical rotary joints and micro-optical systems, such as collimators and lens of systems used for multi-channel transmission of optical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A lens system comprising:
a body member;
at least one micro lens array being held in said body member;
wherein said micro lens arrays have a first surface with a plurality of micro lenses arranged in a row and a second surface opposing the first surface under an oblique angle with optical fibers attached thereon in such a way that the distance from a micro lens to the location where the corresponding optical fiber is attached on the second surface is always the same for each micro lens of the row.

2. The lens system according to claim 1, wherein the optical fibers are bonded, glued or welded to the second surface of one of the micro lens arrays.

3. The lens system according to claim 1, wherein the optical fibers ends are under said oblique angle before attaching them to the second surface of one of the micro lens arrays.

4. The lens system according to claim 1, wherein the optical fibers ends are held by ferrules, by a support member or by first and second support plates.

5. The lens system according to claim 1, wherein the micro lens array has alignment marks for alignment on said body member.

6. The lens system according to claim 1, wherein at least a second rows of second micro lenses is arranged in parallel to the row of micro lenses on the second surface in such a way that the distance from a lens to the location where the corresponding optical fiber is attached on the second surface is always the same for each micro lens of a row.

7. The lens system according to claim 6, wherein the second micro lenses have a different focal length as the first micro lenses.

8. A rotary joint comprising:
a derotating element having two sides for coupling light;
at least one lens system on either side of the derotating element;
the lens system having a body member and at least one micro lens array being held in said body member;
wherein said micro lens arrays have a first surface with a plurality of micro lenses arranged in a row and a second surface opposing the first surface under an oblique angle with optical fibers attached thereon in such a way that the distance from a micro lens to the location where the corresponding optical fiber is attached on the second surface is always the same for each micro lens of the row.

* * * * *